US006427998B1

(12) United States Patent
Norrie et al.

(10) Patent No.: US 6,427,998 B1
(45) Date of Patent: Aug. 6, 2002

(54) REPLENISHMENT ARRANGEMENTS FOR AUTOMATED TELLER MACHINES

(75) Inventors: David K. Norrie, Angus; Derek Pont, Invergowrie by Dundee, both of (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/679,586

(22) Filed: Oct. 4, 2000

(30) Foreign Application Priority Data

Oct. 9, 1999 (GB) ............................................ 9923855

(51) Int. Cl.[7] ............................ B65H 3/62; B65H 1/18; G06F 17/60

(52) U.S. Cl. ........................ 271/145; 271/147; 271/153; 235/385

(58) Field of Search ................................ 271/10.01, 12, 271/147, 153, 145, 375; 235/379, 380, 381, 385

(56) References Cited

U.S. PATENT DOCUMENTS 6,264,102 B1 * 7/2001 Haney et al. ........... 235/379 X
6,270,010 B1 * 8/2001 Junkins et al. .......... 235/379 X

FOREIGN PATENT DOCUMENTS

| | | | |
|---|---|---|---|
| FR | 2590149 | 5/1987 | |
| GB | 2210027 | 6/1989 | |
| JP | 271587 | 12/1986 | |
| JP | 2000-207608 A * | 7/2000 | ................. 235/379 |

* cited by examiner

*Primary Examiner*—Christopher P. Ellis
*Assistant Examiner*—Gene O. Crawford
(74) *Attorney, Agent, or Firm*—Francis L. Conte

(57) ABSTRACT

An automated teller machine includes a stack of currency notes and dispenser for dispensing notes from the stack to authorized users. A marker bill is inserted at a predetermined position in the stack of currency notes to indicate a predetermined quantity of notes remaining within the stack.

26 Claims, 3 Drawing Sheets

REPLENISHMENT ARRANGEMENTS FOR AUTOMATED TELLER MACHINES

BACKGROUND OF THE INVENTION

This invention relates to replenishment arrangements for automated teller machines (ATMs).

In conventional ATMS, stacks of currency notes are stored in one or more currency cassettes and on receipt of a valid cash withdrawal request from a customer, notes are extracted from the cassettes and transported to a cash dispenser slot in a user console. An ATM is generally capable of dispensing notes of several different denominations and separate cassettes are normally provided for notes of each particular denomination.

It is desirable that when the number of currency notes remaining within a particular cassette in the ATM reaches a predetermined critical low level (i.e. a level which may not be sufficient to guarantee that a typical customer cash withdrawal request can be successfully fulfilled using the notes remaining in that particular cassette), indication is provided. Such an indication is typically provided by a sensor comprising a permanent magnet associated with a pusher assembly which is arranged to urge notes towards an exit end of the cassette from which they are extracted. When the pusher assembly reaches a position in the proximity of the exit end, a reed switch mounted within the ATM is activated by the permanent magnet to indicate that the number of notes within the cassette has reached a predetermined low level. The reed switch is commonly positioned so that a low level indication will be given when approximately 75 to 100 notes remain within the cassette. The cassette will then typically be replaced by a new full cassette.

In recent years, free standing ATMs have been installed in bars and shops for the convenience of customers. Often, these machines are loaded with currency notes by the bar landlord or shopkeeper, and for the sake of security it may be desirable to load into and keep in such machines only a relatively small number of notes, i.e. close to or even below the number at which a low level is indicated. Conventional low level sensors may therefore be of little assistance in maintaining such small quantities of notes in an ATM.

SUMMARY OF THE INVENTION

It is an object to provide a flexible means for indicating a low quantity of currency notes remaining in an ATM which is suitable for machines in any installation.

According to the invention, there is provided an ATM comprising a stack of currency notes and means for dispensing notes from the stack to authorized users, characterized by a marker bill inserted at a predetermined position in the stack of currency notes to indicate a predetermined quantity of notes remaining within the stack when dispensed from the stack.

By use of a marker bill, the person who loads the ATM with currency notes can insert the bill at the position in the stack of notes which corresponds to the quantity of notes remaining at which a low level is desired to be indicated. When all the notes in the stack in front of the marker bill have been dispensed, the marker bill itself will be dispensed next. The marker bill removes the need for a conventional indication means, which can reduce the cost of manufacture of the ATM.

Suitably, the marker bill may be in the form of a voucher to prompt the user to present it to the person responsible for loading the machine in order to retrieve its face value, thereby providing an alert to the low level of currency in the machine. Alternatively, the means for dispensing notes from the stack may comprise means for detecting the presence of the marker bill and means for indicating the predetermined quantity of currency notes remaining in the stack upon detection of the marker bill. By providing a means for indicating the predetermined quantity of currency notes remaining in the stack, the person responsible for loading the machine need not be reliant on the user presenting a marker bill for an indication that the level of currency in the machine is low. The means for indicating the predetermined quantity of currency notes remaining in the stack could also activate a switch to close the ATM and prevent further currency withdrawals from taking place to avoid a situation in which a user's request might not otherwise be fulfilled due to a shortage of currency.

Preferably, the ATM further comprises a purge bin and means for automatically transferring the marker bill from the stack to the purge bin upon detection of the marker bill. In this way, the low level indication can be fully automated with no user interaction, the marker bill being retained within the machine while the user receives the currency requested in the normal way.

According to another aspect of the invention, there is provided a method of indicating the quantity of currency notes remaining within an automated teller machine comprising a stack of currency notes and means for dispensing notes from the stack to authorized users, the method comprising the step of inserting a marker bill at a predetermined position in the stack of currency notes.

BRIEF DESCRIPTION OF THE DRAWINGS

The invention will now be described by way of example only with reference to the accompanying drawings, in which.

DETAILED DESCRIPTION

Figure 1:
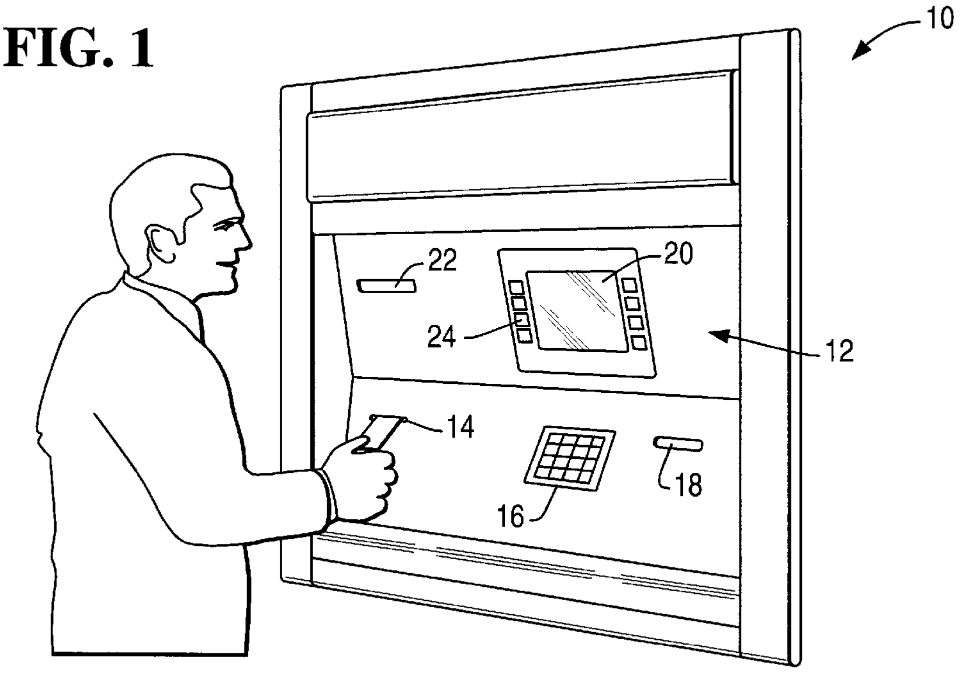
FIG. 1 is an external perspective view of an ATM embodying the invention.

As shown in FIG. 1, the front of an ATM 10 is provided with a user panel 12 including a card reader slot 14 for insertion of a user's identification card, a key pad 16, a cash dispenser slot 18 through which currency is delivered to a user, a display screen 20 and a receipt printer slot 22 through which a receipt for a transaction is delivered to the user at the end of a transaction. In a typical ATM transaction, a user inserts his or her card into the card reader slot 14 and data encoded on the card is read. Instructions are then displayed on the screen 20. The user is requested to enter a personal identification number (PIN) on the key pad 16 which is verified, usually at a central location remote from the ATM 10. If the PIN is determined to be correct against information read from the inserted card, a menu of the various facilities available to the user is then displayed on the screen 20. If a cash withdrawal facility is selected, the user is requested to enter the sum required on the key pad 16 or by means of additional keys 24 provided at the side of the screen 20.

Figure 2:
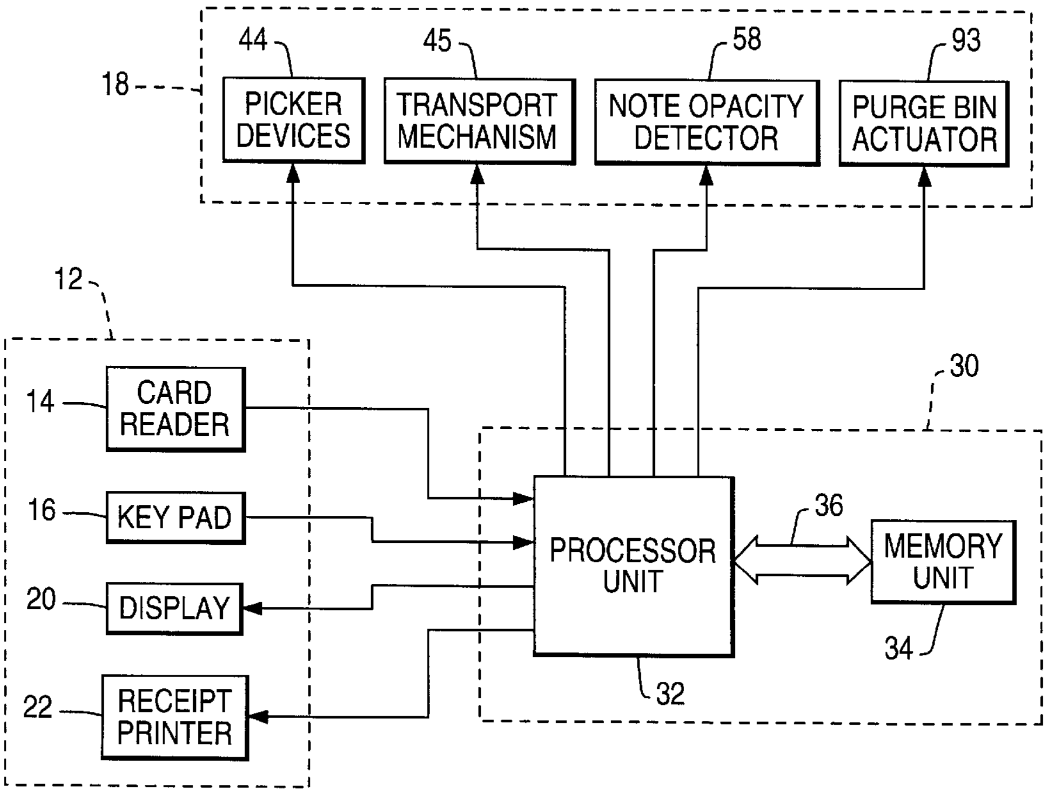
FIG. 2 is a block diagram representation of the ATM of FIG. 1.

The card reader, cash dispenser and receipt printer modules associated with the respective slots 14, 18 and 22 in the user panel 12 are designated by the same reference numerals in FIG. 2. As shown in FIG. 2, the ATM 10 includes a controller unit 30 which communicates with components of the user panel 12 and with various other operating mechanisms of the ATM 10. The controller unit 30 includes a processor unit 32, and a memory unit 34 connected via a bus line 36 to the processor unit 32. The processor unit 32 receives input signals from the card reader 14 and the user panel key pad 16, and provides output signals to various mechanisms of the cash dispenser 18, to display 20 of the user panel 12, and to the user panel receipt printer 22. It should be understood that the processor unit 32 controls the amount of cash dispensed by the cash dispenser 18, the information displayed on the display 20 and the information printed by the printer 22.

Figure 3:
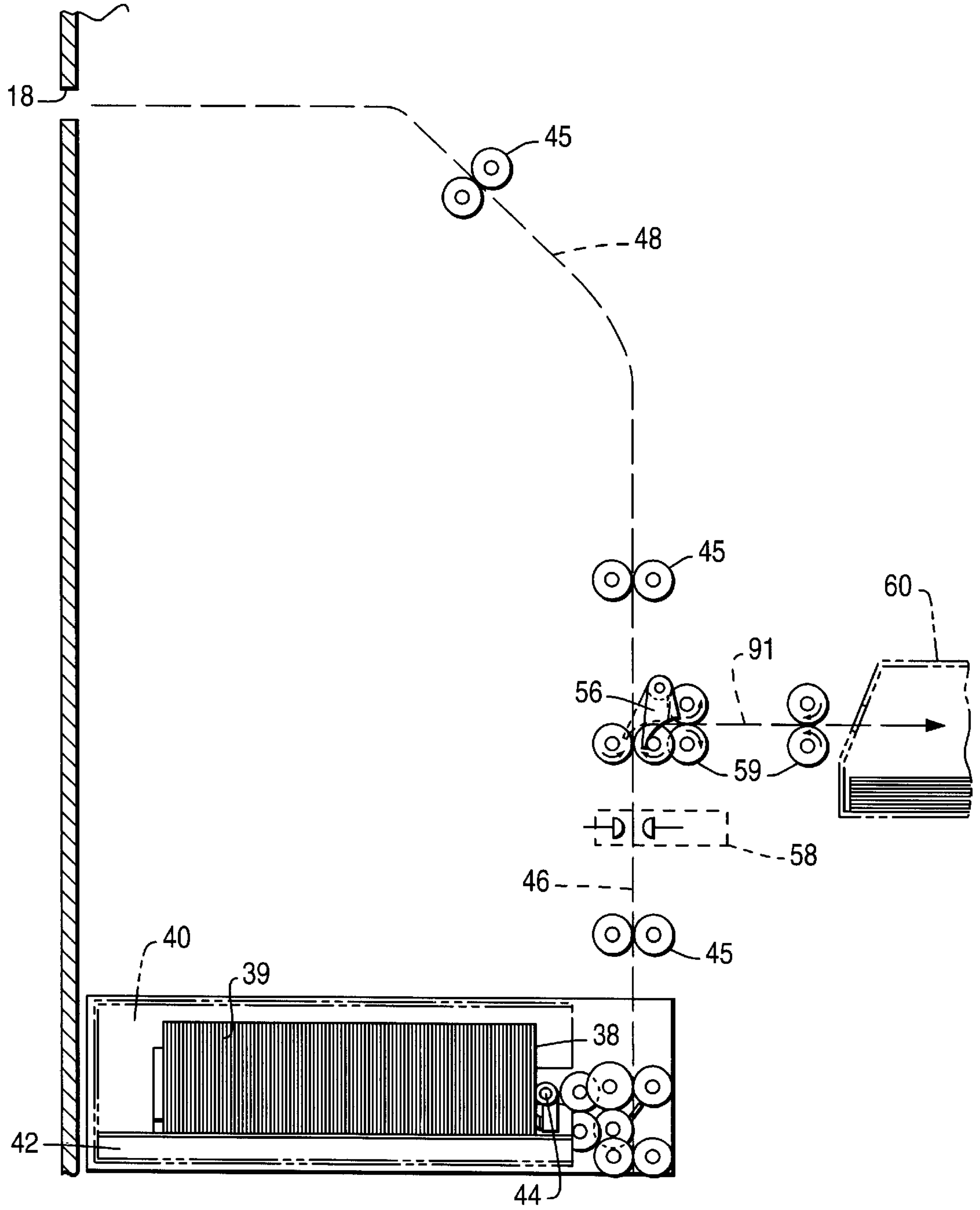
FIG. 3 is a diagrammatic representation of the main operating parts of a cash dispenser of the ATM of FIG. 1.

The various mechanisms within the cash dispenser 18 controlled by the processor unit 32 are additionally illustrated in FIG. 3 and include a note opacity detector 58 for detecting the presence of marker bills of low opacity, vacuum operated picker devices 44 for picking notes from currency cassettes 40, a transport mechanism 45 for transporting notes picked from one or more of the cassettes 40, and a purge bin actuator 56 for a purge bin 60. The processor unit 32 may include a microcomputer, and the memory unit 34 may be a non-volatile RAM.

Figure 4:
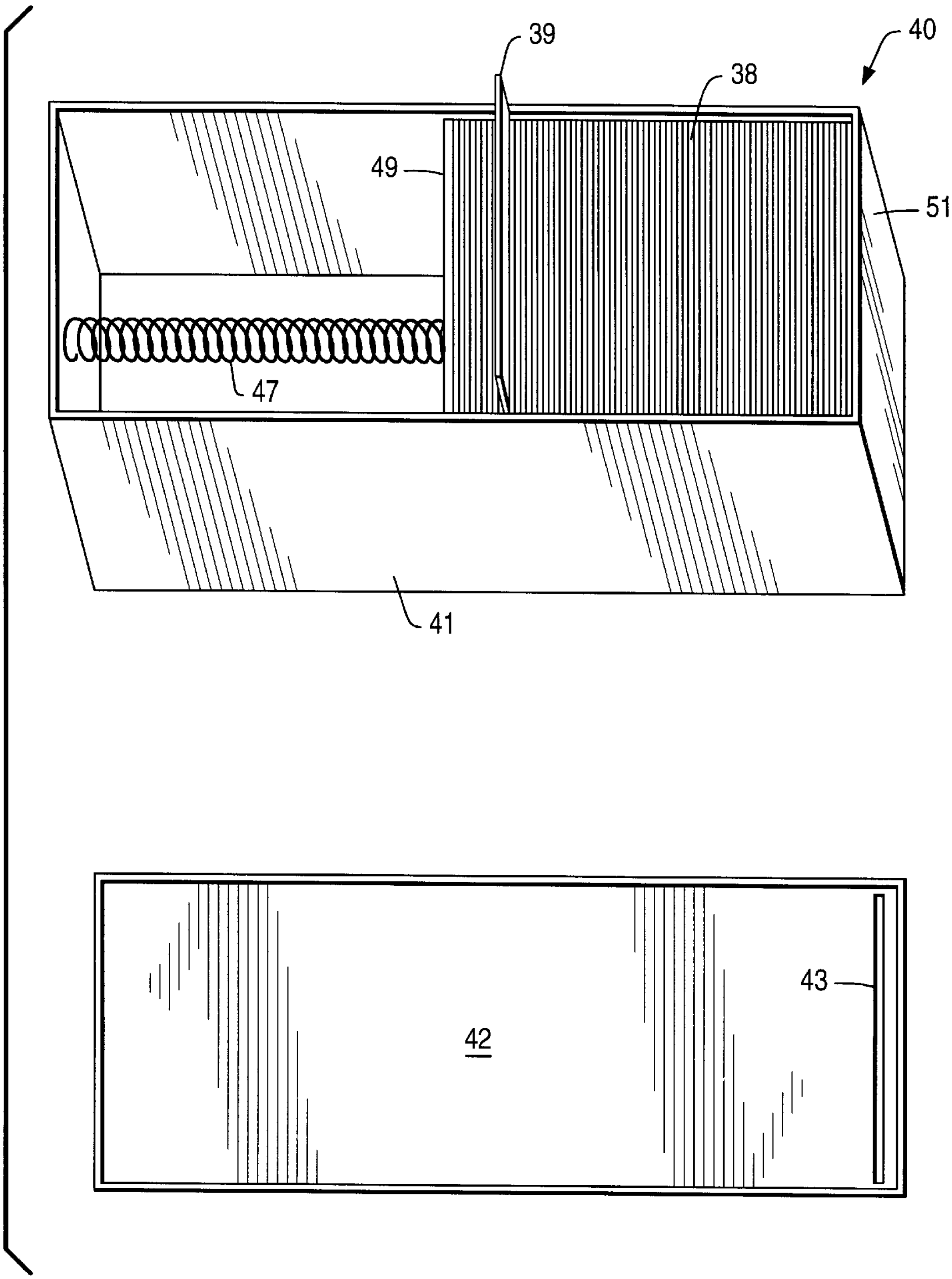
FIG. 4 is a diagrammatic representation of an open currency cassette for use in the ATM of FIG. 1.

With reference to FIG. 4, a stack of bank notes 38 is held in the cassette 40 within the ATM 10. The cassette comprises a box 41 having a removable lid 42 to enable refilling of the cassette with currency when a low level indication is provided to the person responsible for loading the machine. The currency notes rest in the box 41 between a plate 49 and the end wall 51 of the box. The plate 49 is urged towards the end wall 51 by a spring 47. The lid 42 has a slot 43 close to the end wall 51 of the box 41 through which the ATM removes notes from the cassette 40 in response to a cash withdrawal request initiated by a user.

When the cassette 40 has been filled with a stack of currency notes 38, a marker bill 39 of low opacity is placed at a predetermined position towards the back of the stack of notes within the cassette 40 (the marker bill 39 is shown being inserted into the stack 38 in FIG. 4). The lid 42 is then secured to the front of the cassette 40 and the cassette is loaded into the ATM.

Referring now to FIG. 3, when a cash withdrawal function is requested, the picker device 44 serves to extract notes from the cassette 40 via slot 43. The transport mechanism 45 is associated with three feed paths 46, 48 and 91 linked by a diverter 56 and serves to transfer notes from one location to another within the ATM 10. The diverter 56 is not normally actuated and the normal note dispensing path is from the cassette 40 via paths 46 and 48 to the dispenser slot 18. The diverter 56 is controlled by the controller unit 30 to pivot into a second position depending on information received from the note opacity detector 58.

Hence, in normal operation, each user currency request causes the transport mechanism 45 to transfer notes picked from the cassette 40 along a first unidirectional feed path 46, through the opacity detector 58 and past the diverter 56 to the second unidirectional feed path 48 for delivery to the customer. The stack of notes within the cassette 40 thereby diminishes with each such transaction, and the position of the marker bill 39 moves closer to the front of the stack 38 until the marker bill itself is picked from the cassette during one such transaction and is transferred along the feed path 46. As the marker bill 39 passes through the opacity detector 58, a signal is sent to the controller unit 30 indicating the presence of the marker bill on the feed path 46. The controller unit 30 then commands the diverter 56 to pivot into its second position, and the marker bill is transferred to the third unidirectional feed path 91 and into the purge bin 60. At the same time as it commands the diverter to pivot into its second position, the controller unit 30 actuates a low cassette level indication to alert the person responsible for loading the machine of its status. The cash dispenser 18 then resumes processing of the current transaction to fulfill the user's request.

Instead of using a marker bill of low opacity, some other form of marking could be provided on the marker bill and a detector for such marking could be installed along the feed path 46 instead of or as well as the opacity detector 58.

Alternatively, a marker bill could be used which would be dispensed to a user rather than transferred to a purge bin. For example, the marker bill could be in the form of a voucher which could be exchanged for goods or services within the premises in which the ATM is installed. In this way, the user would be prompted to present the marker bill to the landlord, shopkeeper or another person responsible for loading the machine in order to retrieve its face value, and in the process the person responsible for loading the machine would be alerted to the low level of currency in the machine. In this case, the opacity detector 58, diverter 56, feed path 91 and purge bin 60 would all be unnecessary, and an ATM manufactured accordingly without such components would be cheaper to produce.

The invention is described herein with reference to FIGS. 1 to 4 by way of example only. It will be clear that the invention extends to further modifications not described. For example, several cassettes each holding a stack of notes of different denominations and each having a marker bill placed at a predetermined position in each stack could be employed within the ATM.

What is claimed is:

1. An automated teller machine comprising:

a removable currency cassette containing a stack of currency notes;

means for dispensing notes from the cassette to authorized users; and a marker bill inserted at a predetermined position between adjacent currency notes in the cassette to indicate a predetermined positive quantity of notes remaining within the stack when dispensed from the stack.

2. An automated teller machine according to claim 1, wherein the marker bill is in the form of a voucher.

3. An automated teller machine according to claim 1, wherein the means for dispensing notes from the stack includes (i) means for detecting the presence of the marker bill and (ii) means for indicating the predetermined quantity of currency notes remaining in the stack upon detection of the marker bill.

4. An automated teller machine according to claim 3, further comprising (i) a purge bin and (ii) means for automatically transferring the marker bill from the stack to the purge bin upon detection of the marker bill.

5. A method of indicating the quantity of currency notes remaining within a stack of currency notes at an automated teller machine comprising:

inserting a marker bill at a predetermined position between adjacent notes in the stack of currency notes; and dispensing notes unidirectionally from the stack until the marker bill is dispensed unidirectionally from the stack.

6. A method according to claim 5, further comprising:

detecting the presence of the marker bill upon dispensing of the marker bill from the stack; and indicating the predetermined quantity of currency notes remaining in the stack upon detection of the marker bill.

7. A method according to claim 6, further comprising diverting the marker bill to a purge bin upon detection of the marker bill.

8. A method according to claim 6, wherein the marker bill is in the form of a voucher.

9. An automated teller machine comprising:

a cassette including a stack of currency notes;

a marker bill disposed between adjacent notes in said stack; and means for transporting said notes and bill unidirectionally from said cassette.

10. A machine according to claim 9 further comprising:

a user panel including a dispenser slot;

a feed path extending between said cassette and said dispenser slot; and said cassette being removably mounted in said machine.

11. A machine according to claim 10 wherein said cassette comprises a box having a removable lid, with said lid having a removal slot operatively joined to said transporting means for removing said notes and marker bill therethrough.

12. A machine according to claim 10 wherein said transporting means are configured for dispensing said marker bill through said dispenser slot.

13. A machine according to claim 12 wherein said marker bill comprises a redeemable voucher having a face value.

14. A machine according to claim 10 further comprising means for detecting said marker bill along said feed path.

15. A machine according to claim 14 further comprising:

a purge bin adjoining said feed path; and means for diverting said marker bill from said feed path to said purge bin.

16. A machine according to claim 15 wherein said detecting means comprise an opacity detector, and said marker bill is different than said notes, with a correspondingly low opacity.

17. A method of operating an automated teller machine having a currency cassette operatively joined to a dispenser slot in a user panel, said method comprising:

filling said cassette with currency notes;

inserting a marker bill between adjacent notes in said cassette;

loading said filled cassette into said automated teller machine;

dispensing said notes from said cassette and through said dispenser slot;

removing said marker bill from said cassette; and detecting removal of said marker bill from said cassette for indicating quantity of notes remaining therein.

18. A method according to claim 17 further comprising:

dispensing said marker bill from said cassette and through said dispenser slot;

redeeming said dispensed marker bill for a face value thereof; and replenishing currency notes in said cassette, and inserting another marker bill therein.

19. A method according to claim 17 further comprising diverting said marker bill removed from said cassette from dispensing through said dispenser slot.

20. A method according to claim 19 further comprising:

diverting said marker bill removed from said cassette to a purge bin; and activating a low cassette level indication.

21. An automated teller machine comprising:

a stack of currency notes;

means for dispensing notes from the stack to authorized users; and a marker bill inserted at a predetermined position in the stack of currency notes to indicate a predetermined quantity of notes remaining within the stack when dispensed from the stack, wherein the marker bill is in the form of a voucher.

22. An automated teller machine comprising:

a stack of currency notes;

means for dispensing notes from the stack to authorized users;

a marker bill inserted at a predetermined position in the stack of currency notes to indicate a predetermined quantity of notes remaining within the stack when dispensed from the stack, wherein the means for dispensing notes from the stack includes (i) means for detecting the presence of the marker bill and (ii) means for indicating the predetermined quantity of currency notes remaining in the stack upon detection of the marker bill; and (i) a purge bin and (ii) means for automatically transferring the marker bill from the stack to the purge bin upon detection of the marker bill.

23. An automated teller machine comprising:

a dispenser for dispensing notes from a stack of currency notes; and a marker bill for insertion at a predetermined position in the stack of currency notes to indicate a predetermined quantity of notes remaining within the stack when the marker bill is dispensed from the stack, wherein the marker bill is in the form of a voucher.

24. An automated teller machine comprising:

a dispenser for dispensing notes from a stack of currency notes;

a marker bill for insertion at a predetermined position in the stack of currency notes to indicate a predetermined quantity of notes remaining within the stack when the marker bill is dispensed from the stack, wherein the dispenser includes (i) means for detecting the presence of the marker bill and (ii) means for indicating the predetermined quantity of currency notes remaining in the stack upon detection of of the marker bill; and (i) a purge bin and (ii) means for automatically transferring the marker bill from the stack to the purge bin upon detection of the marker bill.

25. A method of indicating the quantity of currency notes remaining within a stack of currency notes at an automated teller machine, the method comprising the steps of:

inserting a marker bill at a predetermined position in the stack of currency notes;

detecting the presences of the marker bill upon dispensing of the marker bill from the stack; and indicating the predetermined quantity of currency notes in the stack upon detection of the marker bill, wherein the marker bill is in the form of a voucher.

26. A method of operating an automated teller machine (ATM), the method comprising the steps of:

detecting the presence of a marker bill which has been inserted at a predetermined position in a stack of currency notes at the ATM; and indicating a predetermined quantity of currency notes remaining within the stack of currency notes upon detection of the marker bill, wherein the marker bill is in the form of a voucher.

* * * * *